United States Patent
Sweeney et al.

(10) Patent No.: US 8,917,270 B2
(45) Date of Patent: Dec. 23, 2014

(54) VIDEO GENERATION USING THREE-DIMENSIONAL HULLS

(75) Inventors: Patrick Sweeney, Woodinville, WA (US); Don Gillett, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 179 days.

(21) Appl. No.: 13/599,263

(22) Filed: Aug. 30, 2012

(65) Prior Publication Data

US 2013/0321410 A1  Dec. 5, 2013

Related U.S. Application Data (60) Provisional application No. 61/653,983, filed on May 31, 2012.

(51) Int. Cl.
*G06T 17/00* (2006.01)
*G06T 15/04* (2011.01)

(52) U.S. Cl.
CPC ...... *G06T 17/00* (2013.01); *G06T 15/04* (2013.01)
USPC .......................................... 345/420; 345/582

(58) Field of Classification Search
None
See application file for complete search history.

(56) References Cited

U.S. PATENT DOCUMENTS

| | | | |
|---|---|---|---|
| 6,072,496 A | 6/2000 | Guenter | |
| 6,226,003 B1 | 5/2001 | Akeley | |
| 6,496,601 B1 | 12/2002 | Migdal | |
| 6,750,873 B1 | 6/2004 | Bernardini et al. | |
| 6,781,591 B2 | 8/2004 | Raskar | |
| 7,023,432 B2 | 4/2006 | Fletcher | |
| 7,096,428 B2 | 8/2006 | Foote | |
| 7,106,358 B2 | 9/2006 | Valliath | |
| 7,142,209 B2 | 11/2006 | Uyttendaele | |
| 7,286,143 B2 | 10/2007 | Kang | |
| 7,348,976 B2 | 3/2008 | Mori | |
| 7,551,232 B2 | 6/2009 | Winger | |
| D610,105 S | 2/2010 | Graham | |
| 7,671,893 B2 | 3/2010 | Li | |
| 7,702,016 B2 | 4/2010 | Winder | |
| 7,778,491 B2 | 8/2010 | Steedly | |
| 7,840,638 B2 | 11/2010 | Zhang | |
| 8,036,491 B2 | 10/2011 | Matsui | |

(Continued)

OTHER PUBLICATIONS

Goldlucke, B, "Multi-camera reconstruction and rendering for free-viewpoint video", Ph. D. Thesis, Nov. 29, 2006, Max-Planck-Institut for Informatik.*

(Continued)

*Primary Examiner* — Jeffery A Brier
*Assistant Examiner* — Diane Wills
(74) *Attorney, Agent, or Firm* — Steve Wight; Judy Yee; Micky Minhas (57) ABSTRACT

Video of a scene is generated and presented to a user. A stream of mesh models of the scene and a corresponding stream of mesh texture maps are generated from one or more streams of sensor data that represent the scene. Each of the mesh models includes a collection of faces, and each of the mesh texture maps defines texture data for one or more points on the faces. Each of the mesh models is broken down into convex sections. Each of the convex sections is surrounded with a three-dimensional hull. The texture data that is associated with each of the faces in the convex section is projected onto the three-dimensional hull, and a hull texture map for the convex section is produced.

20 Claims, 8 Drawing Sheets

(56) References Cited

U.S. PATENT DOCUMENTS

| | | | |
|---|---|---|---|
| 8,441,482 | B2 | 5/2013 | Ozdac et al. |
| 2002/0196256 | A1 | 12/2002 | Hoppe |
| 2003/0218672 | A1 | 11/2003 | Zhang |
| 2004/0044441 | A1* | 3/2004 | Gupta et al. ............... 700/246 |
| 2004/0217956 | A1 | 11/2004 | Besl et al. |
| 2005/0001832 | A1 | 1/2005 | Shen et al. |
| 2005/0017969 | A1 | 1/2005 | Sen |
| 2005/0052452 | A1 | 3/2005 | Baumberg |
| 2005/0280646 | A1 | 12/2005 | Wang |
| 2005/0285875 | A1 | 12/2005 | Kang |
| 2006/0023782 | A1 | 2/2006 | Cai |
| 2006/0028473 | A1 | 2/2006 | Uyttendaele |
| 2006/0028489 | A1 | 2/2006 | Uyttendaele |
| 2006/0158509 | A1 | 7/2006 | Kenoyer |
| 2006/0221072 | A1 | 10/2006 | Se et al. |
| 2006/0262856 | A1 | 11/2006 | Wu |
| 2007/0070177 | A1 | 3/2007 | Christensen |
| 2007/0236656 | A1 | 10/2007 | Jeong |
| 2007/0263080 | A1 | 11/2007 | Harrell |
| 2008/0088626 | A1 | 4/2008 | Habe |
| 2009/0033740 | A1 | 2/2009 | Ishikawa |
| 2009/0109280 | A1 | 4/2009 | Gotsman |
| 2009/0128548 | A1 | 5/2009 | Gloudemans |
| 2010/0026712 | A1 | 2/2010 | Aliprandi |
| 2010/0080448 | A1 | 4/2010 | Tam |
| 2010/0158388 | A1 | 6/2010 | Bookout |
| 2010/0201681 | A1 | 8/2010 | Criminisi |
| 2010/0225735 | A1 | 9/2010 | Shaffer |
| 2010/0254627 | A1 | 10/2010 | Panahpour Tehrani et al. |
| 2010/0259595 | A1 | 10/2010 | Trimeche |
| 2010/0262628 | A1 | 10/2010 | Singer |
| 2010/0265248 | A1 | 10/2010 | McCrae |
| 2010/0303303 | A1 | 12/2010 | Shen et al. |
| 2010/0321378 | A1 | 12/2010 | Betzler |
| 2010/0328475 | A1 | 12/2010 | Thomas |
| 2010/0329358 | A1 | 12/2010 | Zhang |
| 2011/0032251 | A1 | 2/2011 | Pothana |
| 2011/0050859 | A1 | 3/2011 | Kimmel |
| 2011/0058021 | A1 | 3/2011 | Chen |
| 2011/0093273 | A1 | 4/2011 | Lee |
| 2011/0096832 | A1 | 4/2011 | Zhang |
| 2011/0169824 | A1 | 7/2011 | Fujinami |
| 2011/0181685 | A1 | 7/2011 | Saleh |
| 2011/0211749 | A1 | 9/2011 | Tan |
| 2012/0075303 | A1 | 3/2012 | Johnsson |
| 2013/0257853 | A1 | 10/2013 | Schmidt |

OTHER PUBLICATIONS

Kanade et al., "Virtualized Reality: Constructing Virtual Worlds from Real Scenes", IEEE Multimedia 4(1), pp. 34-47, 1997.*
Kalvin et al., "Superfaces: Polygonal Mesh Simplification with Bounded Error", IEEE Computer Graphics and Application, 1996, p. 64-77.*
Rus et al., "Analysing the Influence of Vertex Clustering on PCA-Based Dynamic Mesh Compression", Lecture Notes in Computer Science, vol. 6169, 2010, p. 55-66.*
Chang et al., "Principal Component Analysis-based Mesh Decomposition", Journal of Information Science and Engineering 25, 2009, p. 971-987.*
Rusinkiewicz et al. "QSplat: A Multiresolution Point Rendering System for Large Meshes", SIGGRAPH 2000, ACM, 2000, p. 343-352.*
Newcombe et al., "Live Dense Reconstruction with a Single Moving Camera", Computer Vision and Pattern Recognition, IEEE, 2010.*
Mamou, Khaled et al., "A simple and efficient approach for 3D mesh approximate convex decomposition." Image Processing (ICIP), 2009 16th IEEE International Conference on. IEEE, 2009.*
Cooper, O. D., Robust generation of 3D models from video footage of urban scenes, Ph.D Thesis, University of Bristol, Mar. 2005.
Gautier, J., E. Bosc, L. Morin, Representation and coding of 3D video data, Nov. 17, 2010, pp. 1-43.
Goldlücke, B., Multi-camera reconstruction and rendering for free-viewpoint video, Ph.D. Thesis, Nov. 29, 2006, pp. 1-164, Max-Planck-Institut für Informatik.
Li, W., Free viewpoint video with image-based rendering, Ph.D Dissertation, May 2010, pp. 1-151, Arizona State University.
Pollefeys, M., D. Nistér, J.-M. Frahm, A. Akbarzadeh, P. Mordohai, B. Clipp, C. Engels, D. Gallup, S. J. Kim, P. Merrell, C. Salmi, S. N. Sinha, B. Talton, L. Wang, Q. Yang, H. Stewénius, R. Yang, G. Welch, H. Towles, Detailed real-time urban 3D reconstruction from video, Int'l J. of Comp. Vision, Jul. 2008, pp. 143-167, vol. 78, No. 2-3.
Sugden, B., M. Iwanicki, Mega meshes: Modelling, rendering and lighting a world made of 100 billion polygons, Game Developers Conf., Feb. 28-Mar. 4, 2011, pp. 1-67, San Francisco, CA.
Aliaga, D. G., I. Carlbom, A spatial image hierarchy for compression in image-based-rendering, Proc. of the 2005 Int'l Conf. on Image Processing, ICIP 2005, Sep. 11-14, 2005, pp. 609-612, vol. 1, Genoa, Italy.
Arsenault, R., C. Ware, Frustum view angle, observer view angle and VE navigation, Proc. of the 5th Symposium on Virtual Reality, Oct. 7-10, 2002, Fortaleza, CE, Brazil.
Berger, K., K. Ruhl, Y. Schroeder, C. Bruemmer, A. Scholz, M. A. Magnor, Markerless motion capture using multiple color-depth sensors, Proc. of the Vision, Modeling, and Visualization Workshop 2011, VMV 2011, Oct. 4-6, 2011, pp. 317-324, Berlin, Germany.
Bogomjakov, A., C. Gotsmann, M. Magnor, Free-viewpoint video from depth cameras, Proc. Vision, Modeling and Visualization, Nov. 2006, pp. 89-96.
Boukerche, A., R. Jarrar, R. W. Pazzi, A novel interactive streaming protocol for image-based 3D virtual environment navigation, Proc. of IEEE Int'l Conf. on Communications, ICC 2009, Jun. 14-18, 2009, pp. 1-6, Dresden, Germany.
Carranza, J., C. Theobalt, M. A. Magnor, H.-P. Seidel, Free-viewpoint video of human actors, ACM Trans. Graph., Jul. 2003, pp. 569-577, vol. 22, No. 3.
Deering, M., Geometry compression, Proc. of the 22nd Annual Conf. on Comp. Graphics and Interactive Techniques, SIGGRAPH 1995, Aug. 6-11, 1995, pp. 13-20, Los Angeles, CA, USA.
Do, L., S. Zinger, P.H.N. de With, Quality improving techniques for free-viewpoint DIBR, 3DTV-Conference: The True Vision Capture, Transmission and Display of 3D Video, May 4-6, 2009, pp. 1-4, Potsdam, Germany.
Eisemann, M., F. Klose, M. A. Magnor, Towards plenoptic Raumzeit reconstruction, Video Processing and Computational Video—International Seminar, Oct. 10-15, 2010, pp. 1-24, Dagstuhl Castle, Germany.
Eisert, P., Virtual video conferencing using 3D model-assisted image-based rendering, The 2nd IEE European Conf. on Visual Media Production, CVMP 2005, Nov. 30-Dec. 1, 2005, pp. 185-193.
Ekmekcioglu, E., B. Gunel, M. Dissanayake, S. T. Worrall, A. M. Kondoz, A scalable multi-view audiovisual entertainment framework with content-aware distribution, 17th IEEE Int'l Conf. on Image Processing, ICIP 2010, Sep. 26-29, 2010, pp. 2401-2404, Hong Kong.
Fitzgibbon, A. W., Y. Wexler, A. Zisserman, Image-based rendering using image-based priors, 9th IEEE Int'l Conf. on Comp. Vision, ICCV 2003, Oct. 14-17, 2003, pp. 1176-1183, Nice, France.
Grau, O., Multi-view 4D reconstruction of human action for entertainment applications, Research and Development White Paper, British Broadcasting Company, Nov. 2011, pp. 1-21.
Guillemaut, J.-Y., A. Hilton, Joint multi-layer segmentation and reconstruction for free-viewpoint video applications, Int'l J. of Comp. Vision, May 2011, pp. 73-100, vol. 93, No. 1.
Hornung, A., L. Kobbelt, Interactive pixel-accurate free viewpoint rendering from images with silhouette aware sampling, Comput. Graph. Forum, Dec. 2009, pp. 2090-2103, vol. 28, No. 8.
Kilner, J., J. Starck, A. Hilton, A comparative study of free-viewpoint video techniques for sports events, European Conf. on Visual Media Production, Nov. 29-30, 2006, pp. 87-96.
Kim, Y. M., D. Chan, C. Theobalt, S. Thrun, Design and calibration of a multi-view TOF sensor fusion system, IEEE Comp. Society Conf. on Comp. Vision and Pattern Recognition Workshops, CVPRW 2008, Jun. 23-28, 2008, pp. 1-7.
Kurashima, C. S., R. Yang, A. Lastra, Combining approximate geometry with view-dependent texture mapping—A hybrid approach to 3D video teleconferencing, 15th Brazilian Symposium on Comp.

(56) References Cited

OTHER PUBLICATIONS

Graphics and Image Processing, SIBGRAPI 2002, Oct. 7-10, 2002, pp. 112-119, Fortaleza-CE, Brazil.

Kuster, C., T. Popa, C. Zach, C. Gotsman, M. H. Gross, FreeCam: A hybrid camera system for interactive free-viewpoint video, Proc. of the Vision, Modeling, and Visualization Workshop 2011, VMV 2011, Oct. 4-6, 2011, pp. 17-24, Berlin, Germany.

Lai, K.-K., Y.-L. Chan, C.-H. Fu, W.-C. Siu, Viewpoint switching in multiview videos using SP-frames, Proc. of the Int'l Conf. on Image Processing, ICIP 2008, Oct. 12-15, 2008, pp. 1776-1779, San Diego, California, USA.

Lamboray, E., S. Würmlin, M. Waschbüsch, M. H. Gross, H. Pfister, Unconstrained free-viewpoint video coding, Proc. of the 2004 Int'l Conf. on Image Processing, ICIP 2004, Oct. 24-27, 2004, pp. 3261-3264, Singapore.

Lei, C., Y.-H. Yang, Efficient geometric, photometric, and temporal calibration of an array of unsynchronized video cameras, Sixth Canadian Conf. on Comp. and Robot Vision, CRV 2009, May 25-27, 2009, pp. 162-169, Kelowna, British Columbia, Canada.

Lipski, C., C. Linz, K. Berger, A. Sellent, M. A. Magnor, Virtual video camera: Image-based viewpoint navigation through space and time, Comput. Graph. Forum, Dec. 2010, pp. 2555-2568, vol. 29, No. 8.

Liu, Y., Q. Dai, W. Xu, A point-cloud-based multiview stereo algorithm for free-viewpoint video, IEEE Trans. Vis. Comput. Graph., May/Jun. 2010, pp. 407-418, vol. 16, No. 3.

Liu, S., K. Kang, J.-P. Tarel, D. B. Cooper, Free-form object reconstruction from silhouettes, occluding edges and texture edges: A unified and robust operator based on duality, IEEE Trans. Pattern Anal. Mach. Intell., Jan. 2008, pp. 131-146, vol. 30, No. 1.

Lu, Z., Y.-W. Tai, M. Ben-Ezra, M. S. Brown, A framework for ultra high resolution 3D imaging, The Twenty-Third IEEE Conf. on Comp. Vision and Pattern Recognition, CVPR 2010, Jun. 13-18, 2010, pp. 1205-1212, San Francisco, CA, USA.

Morvan, Y., D. Farin, P. De With, System architecture for free-viewpoint video and 3D-TV, IEEE Transactions on Consumer Electronics, May 2008, pp. 925-932, vol. 54, No. 2.

Nabeshima, R., M. Ueda, D. Arita, R. Taniguchi, Frame rate stabilization by variable resolution shape reconstruction for on-line free-viewpoint video generation, Proc. of the 7th Asian Conf. On Comp. Vision, Jan. 13-16, 2006, pp. 81-90, Hyderabad, India.

Piatti, D., Time-of-flight cameras: Tests, calibration and multi-frame registration for automatic 3D object reconstruction, 2011, pp. 1-10.

Shi, S., W. J. Jeon, K. Nahrstedt, R. H. Campbell, Real-time remote rendering of 3D video for mobile devices, Proc. of the 17th Int'l Conf. on Multimedia 2009, ACM Multimedia 2009, Oct. 19-24, 2009, pp. 391-400, Vancouver, British Columbia, Canada.

Smolić, A., K. Muller, P. Merkle, T. Rein, M. Kautzner, P. Eisert, T. Wiegand, Free viewpoint video extraction, representation, coding, and rendering, Proc. of the 2004 Int'l Conf. on Image Processing, ICIP 2004, Oct. 24-27, 2004, pp. 3287-3290, vol. 5, Singapore.

Smolić, A., P. Kauff, Interactive 3D video representation and coding technologies, Invited Paper, Proc. of the IEEE, Special Issue on Advances in Video Coding and Delivery, Jan. 2005, pp. 98-110, vol. 93, No. 1.

Starck, J., J. Kilner, A. Hilton, A free-viewpoint video renderer, J. Graphics, GPU, & Game Tools, 2009, pp. 57-72, vol. 14, No. 3.

Kilner, J., J. Starck, J.-Y. Guillemaut, A. Hilton, Objective quality assessment in free-viewpoint video production, Sig. Proc.: Image Comm., Jan. 2009, pp. 3-16, vol. 24, No. 1-2.

Starck, J., J. Kilner, A. Hilton, Objective quality assessment in free-viewpoint video production, 3DTV Conf.: The True Vision—Capture, Transmission and Display of 3D Video, May 28-30, 2008, pp. 225-228, Istanbul, Turkey.

Theobalt, C., M. Li, M. A. Magnor, H.-P. Seidel, A flexible and versatile studio for synchronized multi-view video recording, Vision, Video, and Graphics, VVG 2003, Jul. 10-11, 2003, pp. 9-16, University of Bath, UK.

Tian, D. P.-L. Lai, P. Lopez, C. Gomila, View synthesis techniques for 3D video, Proc. of the SPIE Applications of Digital Image Processing XXII, Sep. 2009, pp. 74430T-74430T-11, vol. 7443.

Vertegaal, R., I. Weevers, C. Sohn, C. Cheung, GAZE-2: Conveying eye contact in group video conferencing using eye-controlled camera direction, Proc. of the 2003 Conf. on Human Factors in Computing Systems, CHI 2003, Apr. 5-10, 2003, pp. 521-528, Ft. Lauderdale, Florida, USA.

Wei, X., L. Yin, Z. Zhu, Q. Ji, Avatar-mediated face tracking and lip reading for human computer interaction, Proc. of the 12th ACM Int'l Conf. on Multimedia, ACM Multimedia 2004, Oct. 10-16, 2004, pp. 500-503, New York, NY, USA.

Wikipedia, Hidden surface determination, Apr. 23, 2012, pp. 1-4.

Würmlin, S., E. Lamboray, M. Waschbüsch, M. Gross, Dynamic point samples for free-viewpoint video, Proc. of the Picture Coding Symposium, Dec. 15-17, 2004, pp. 6, San Francisco, CA.

Würmlin, S., E. Lamboray, M. Waschbüsch, P. Kaufman, A. Smolić, M. Gross, Image-space free-viewpoint video, Vision, Modeling, and Visualization, VMV 2005, Nov. 16-18, 2005, pp. 453-460, Erlangen, Germany.

Yea, S., A. Vetro, View synthesis prediction for multiview video coding, Sig. Proc.: Image Comm., Jan. 2009, pp. 89-100, vol. 24, No. 1-2.

Yea, S., A. Vetro, View synthesis prediction for rate-overhead reduction in FTV, 3DTV Conf.: The True Vision—Capture, Transmission and Display of 3D Video, May 28-30, 2008, pp. 145-148, Istanbul, Turkey.

Zhu, Y., A novel view multi-view synthesis approach for free viewpoint video, Int'l Joint Conf. on Artificial Intelligence, JCAI '09, Apr. 25-26, 2009, pp. 88-91, Hainan Island, China.

Ziegler, G., H. P. A. Lensch, M. Magnor, H.-P. Seidel, Multi-video compression in texture space using 4D SPIHT, 2004 IEEE 6th Workshop on Multimedia Signal Processing, Sep. 29-Oct. 1, 2004, pp. 39-42, MPI Informatik, Saarbrucken, Germany.

Zitnick, C. L., S. B. Kang, M. Uyttendaele, S. A. J. Winder, R. Szeliski, High-quality video view interpolation using a layered representation, ACM Trans. Graph., Aug. 2004, pp. 600-608, vol. 23, No. 3.

Morvan, Y., and C. O'Sullivan, Visual tuning of an image-based rendering algorithm, Proceedings of Eurographics, Oct. 2006, pp. 1-6, Ireland, Dublin.

Li, et al., "Joint View Filtering for Multiview Depth Map Sequences", in 19th IEEE International Conference on Image Processing, Sep. 30, 2012, pp. 1329-1332.

Morvan, et al., "Multiview Depth-Image Compression Using an Extended H.264 Encoder", in Advanced Concept for Intelligent Vision Systems, Aug. 28, 2007, pp. 675-686.

Ochotta, et al., "Image-Based Surface Compression", in Computer Graphics Forum, vol. 27, Issue 6, Sep. 1, 2008, 15 pages.

Park et al., "Efficient Depth Compression Based on Partial Surface for 3-D Object Represented by Layered Depth Images", in IEEE Signal Processing Letters, vol. 17, Issue 10, Oct. 1, 2010, pp. 839-842.

Sun, et al., "Rate-Distortion Optimized-3D Reconstruction from Noise-Corrupted Multi view Depth Videos", in IEEE International Conference on Multimedia and Expo, Jul. 15, 2013, pp. 1-6.

Morvan, Y., C. O'Sullivan, Visual Tuning of an Image-Based Rendering Algorithm, Proc. of Eurographics; Oct. 2006, pp. 1-6, Ireland, Dublin.

Wikipedia, K-d-tree.pdf, May 2, 2012, p. 1.

Yang, Yi, U.S. Office Action, U.S. Appl. No. 13/566,796, Apr. 18, 2014, pp. 1-13.

\* cited by examiner

VIDEO GENERATION USING THREE-DIMENSIONAL HULLS

CROSS REFERENCE TO RELATED APPLICATION

This application claims the benefit of and priority to provisional U.S. patent application Ser. No. 61/653,983 filed May 31, 2012.

BACKGROUND

A given video generally includes one or more scenes, where each scene in the video can be either relatively static (e.g., the objects in the scene do not substantially change or move over time) or dynamic (e.g., the objects in the scene substantially change and/or move over time). As is appreciated in the art of computer graphics, polygonal modeling is commonly used to represent three-dimensional objects in a scene by approximating the surface of each object using polygons. A polygonal model of a given scene includes a collection of vertices. Two neighboring vertices that are connected by a straight line form an edge in the polygonal model. Three neighboring and non-co-linear vertices that are interconnected by three edges form a triangle in the polygonal model. Four neighboring and non-co-linear vertices that are interconnected by four edges form a quadrilateral in the polygonal model. Triangles and quadrilaterals are the most common types of polygons used in polygonal modeling, although other types of polygons may also be used depending on the capabilities of the renderer that is being used to render the polygonal model. A group of polygons that are interconnected by shared vertices are referred to as a mesh and as such, a polygonal model of a scene is also known as a mesh model. Each of the polygons that makes up a mesh is referred to as a face in the polygonal/mesh model. Accordingly, a polygonal/mesh model of a scene includes a collection of vertices, edges and polygonal (i.e., polygon-based) faces that represents/approximates the shape of each object in the scene.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Video generation technique embodiments described herein are generally applicable to generating a video of a scene and presenting it to a user. In an exemplary embodiment of this generation, one or more streams of sensor data that represent the scene are input. Scene proxies which geometrically describe the scene as a function of time are then generated from the streams of sensor data. This scene proxies generation includes the following actions. A stream of mesh models of the scene and a corresponding stream of mesh texture maps are generated from the streams of sensor data, where each of the mesh models includes a collection of vertices and a collection of polygonal faces that are formed by the vertices, and each of the mesh texture maps defines texture data for one or more points on each of the polygonal faces. Then, for each of the mesh models, the following actions take place. The mesh model is broken down into one or more convex sections. Then, for each of the convex sections of the mesh model, a three-dimensional (3D) hull that surrounds the convex section is defined, the convex section is surrounded with the 3D hull, and the texture data that is associated with each of the polygonal faces in the convex section is projected onto the 3D hull, where this projection produces a hull texture map for the convex section.

In an exemplary embodiment of the just mentioned presentation, the scene proxies are input. The scene proxies include a stream of mesh models of the scene, where each of the mesh models includes a collection of polygonal faces, and each of the mesh models is broken down into one or more convex sections. For each of the convex sections of each of the mesh models, the scene proxies also include a mathematical equation describing a 3D hull that surrounds the convex section, data specifying the size of this 3D hull, data specifying the position of this 3D hull in relation to the portion of the mesh model that is in the convex section, and a hull texture map for the convex section. This hull texture map includes data defining a plurality of points on the 3D hull, and data for each of these points that associates the point with texture data and also associates the point with a normal which defines a direction from one of the faces in the convex section to the 3D hull. After the scene proxies have been input, images of the scene are rendered therefrom and displayed. This image rendering includes the following actions for each of the convex sections of each of the mesh models. The portion of the mesh model that is in the convex section is rendered. The mathematical equation describing a 3D hull that surrounds the convex section, the data specifying the size of this 3D hull, and the data specifying the position of this 3D hull in relation to this portion of the mesh model are then used to surround the convex section with this 3D hull. Then, for each of the points on the 3D hull, the point is projected along the normal that is associated with the point and onto the portion of the mesh model that is in the convex section, and the texture data that is associated with the point is assigned to the corresponding projected point on this portion of the mesh model.

DESCRIPTION OF THE DRAWINGS

The specific features, aspects, and advantages of the video generation technique embodiments described herein will become better understood with regard to the following description, appended claims, and accompanying drawings where:

DETAILED DESCRIPTION

In the following description of video generation technique embodiments reference is made to the accompanying drawings which form a part hereof, and in which are shown, by way of illustration, specific embodiments in which the video generation technique can be practiced. It is understood that other embodiments can be utilized and structural changes can be made without departing from the scope of the video generation technique embodiments.

It is also noted that for the sake of clarity specific terminology will be resorted to in describing the video generation technique embodiments described herein and it is not intended for these embodiments to be limited to the specific terms so chosen. Furthermore, it is to be understood that each specific term includes all its technical equivalents that operate in a broadly similar manner to achieve a similar purpose. Reference herein to "one embodiment", or "another embodiment", or an "exemplary embodiment", or an "alternate embodiment", or "one implementation", or "another implementation", or an "exemplary implementation", or an "alternate implementation" means that a particular feature, a particular structure, or particular characteristics described in connection with the embodiment or implementation can be included in at least one embodiment of the video generation technique. The appearances of the phrases "in one embodiment", "in another embodiment", "in an exemplary embodiment", "in an alternate embodiment", "in one implementation", "in another implementation", "in an exemplary implementation", and "in an alternate implementation" in various places in the specification are not necessarily all referring to the same embodiment or implementation, nor are separate or alternative embodiments/implementations mutually exclusive of other embodiments/implementations. Yet furthermore, the order of process flow representing one or more embodiments or implementations of the video generation technique does not inherently indicate any particular order not imply any limitations of the video generation technique.

The term "three-dimensional (3D) hull" is used herein to refer to any 3D shape that can be defined by a mathematical equation and is used to surround a given convex section of a given mesh model. Exemplary types of 3D hulls that can be used in the video generation technique embodiments described herein include, but are not limited to a sphere, an ellipsoid, a cube, and a rectangular cuboid (also known as either a right rectangular prism, or a rectangular parallelepiped, among other things).

The term "sensor" is used herein to refer to any one of a variety of scene-sensing devices which can be used to generate a stream of sensor data that represents a given scene. Generally speaking and as will be described in more detail hereafter, the video generation technique embodiments described herein employ one or more sensors which can be configured in various arrangements to capture a scene, thus allowing one or more streams of sensor data to be generated each of which represents the scene from a different geometric perspective. Each of the sensors can be any type of video capture device (e.g., any type of video camera), or any type of audio capture device (such as a microphone, or the like), or any combination thereof. Each of the sensors can also be either static (i.e., the sensor has a fixed spatial location and a fixed rotational orientation which do not change over time), or moving (i.e., the spatial location and/or rotational orientation of the sensor change over time). The video generation technique embodiments described herein can employ a combination of different types of sensors to capture a given scene.

1.0 Video Generation Using Three-Dimensional (3D) Hulls

The video generation technique embodiments described herein generally involve using 3D hulls to generate a video of a given scene and then present the video to one or more end users. The video generation technique embodiments support the generation, storage, distribution, and end user presentation of any type of video. By way of example but not limitation, one embodiment of the video generation technique supports various types of traditional, single viewpoint video in which the viewpoint of the scene is chosen by the director when the video is recorded/captured and this viewpoint cannot be controlled or changed by an end user while they are viewing the video. In other words, in a single viewpoint video the viewpoint of the scene is fixed and cannot be modified when the video is being rendered and displayed to an end user. Another embodiment of the video generation technique supports various types of free viewpoint video in which the viewpoint of the scene can be interactively controlled and changed by an end user at will while they are viewing the video. In other words, in a free viewpoint video an end user can interactively generate synthetic (i.e., virtual) viewpoints of the scene on-the-fly when the video is being rendered and displayed. Exemplary types of single viewpoint and free viewpoint video that are supported by the video generation technique embodiments are described in more detail hereafter.

The video generation technique embodiments described herein are advantageous for various reasons including, but not limited to, the following. Generally speaking and as will be appreciated from the more detailed description that follows, the video generation technique embodiments serve to minimize the size of (i.e., minimize the amount of data in) the video that is generated, stored and distributed. Based on this video size/data minimization, it will also be appreciated that the video generation technique embodiments minimize the cost and maximize the performance associated with storing and transmitting the video in a client-server framework where the video is generated and stored on a server computing device, and then transmitted from the server over a data communication network to one or more client computing devices upon which the video is rendered and then viewed and navigated by the one or more end users. Furthermore, the video generation technique embodiments maximize the photo-realism of the video that is generated when it is rendered and then viewed and navigated by the end users. As such, the video generation technique embodiments provide the end users with photo-realistic video that is free of discernible artifacts, thus creating a feeling of immersion for the end users and enhancing their viewing experience.

Additionally, the video generation technique embodiments described herein eliminate having to constrain the complexity or composition of the scene that is being captured (e.g., neither the environment(s) in the scene, nor the types of objects in the scene, nor the number of people of in the scene, among other things has to be constrained). Accordingly, the video generation technique embodiments are operational with any type of scene, including both relatively static and dynamic scenes. The video generation technique embodiments also provide a flexible, robust and commercially viable method for generating a video, and then presenting it to one or more end users, that meets the needs of today's various creative video producers and editors. By way of example but not limitation and as will be appreciated from the more detailed description that follows, the video generation technique embodiments are applicable to various types of video-based media applications such as consumer entertainment (e.g., movies, television shows, and the like) and video-conferencing/telepresence, among others.

1.1 Video Processing Pipeline

Figure 1:
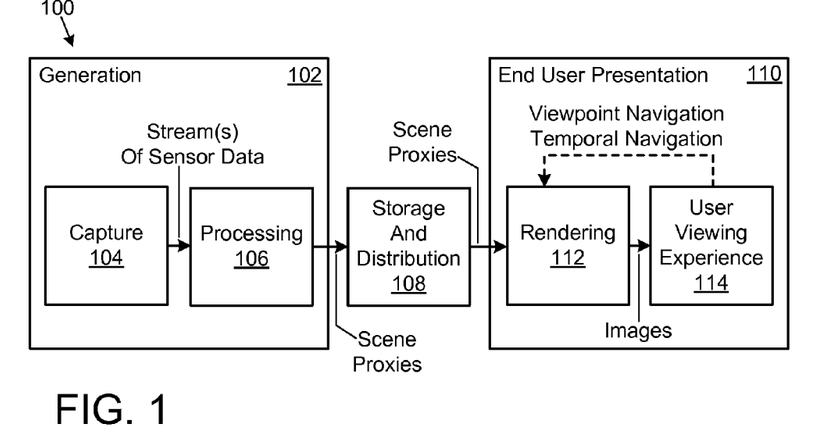
FIG. 1 is a diagram illustrating an exemplary embodiment, in simplified form, of a video processing pipeline for implementing the video generation technique embodiments described herein.

FIG. 1 illustrates an exemplary embodiment, in simplified form, of a video processing pipeline for implementing the video generation technique embodiments described herein. As noted heretofore, the video generation technique embodiments support the generation, storage, distribution, and end user presentation of any type of video including, but not limited to, various types of single viewpoint video and various types of free viewpoint video. As exemplified in FIG. 1, the video processing pipeline 100 start with a generation stage 102 during which, and generally speaking, scene proxies of a given scene are generated. The generation stage 102 includes a capture sub-stage 104 and a processing sub-stage 106 whose operation will now be described in more detail.

Referring again to FIG. 1, the capture sub-stage 104 of the video processing pipeline 100 generally captures the scene and generates one or more streams of sensor data that represent the scene. More particularly, in an embodiment of the video generation technique described herein where a single viewpoint video is being generated, stored, distributed and presented to one or more end users (hereafter simply referred to as the single viewpoint embodiment of the video generation technique), during the capture sub-stage 104 a single sensor is used to capture the scene, where the single sensor includes a video capture device and generates a single stream of sensor data which represents the scene from a single geometric perspective. The stream of sensor data is input from the sensor and then output to the processing sub-stage 106. In another embodiment of the video generation technique described herein where a free viewpoint video is being generated, stored, distributed and presented to one or more end users (hereafter simply referred to as the free viewpoint embodiment of the video generation technique), during the capture sub-stage 104 an arrangement of sensors is used to capture the scene, where the arrangement includes a plurality of video capture devices and generates a plurality of streams of sensor data each of which represents the scene from a different geometric perspective. These streams of sensor data are input from the sensors and calibrated, and then output to the processing sub-stage 106.

Referring again to FIG. 1, the processing sub-stage 106 of the video processing pipeline 100 inputs the stream(s) of sensor data from the capture sub-stage 104, and then generates scene proxies that geometrically describe the captured scene as a function of time from the stream(s) of sensor data. The scene proxies are then output to a storage and distribution stage 108.

Referring again to FIG. 1, the storage and distribution stage 108 of the video processing pipeline 100 inputs the scene proxies from the processing sub-stage 106, stores the scene proxies, outputs the scene proxies and distributes them to one or more end users who either are, or will be, viewing the video, or both. In an exemplary embodiment of the video generation technique described herein where the generation stage 102 is implemented on one computing device (or a collection of computing devices) and an end user presentation stage 110 of the pipeline 100 is implemented on one or more end user computing devices, this distribution takes place by transmitting the scene proxies over whatever one or more data communication networks the end user computing devices are connected to. It will be appreciated that this transmission is implemented in a manner that meets the needs of the specific implementation of the video generation technique embodiments and the related type of video that is being processed in the pipeline 100.

Referring again to FIG. 1 and generally speaking, the end user presentation stage 110 of the video processing pipeline 100 inputs the scene proxies that are output from the storage and distribution stage 108, and then presents each of the end users with a rendering of the scene proxies. The end user presentation stage 110 includes a rendering sub-stage 112 and a user viewing experience sub-stage 114 whose operation will now be described in more detail.

Referring again to FIG. 1, in the single viewpoint embodiment of the video generation technique described herein the rendering sub-stage 112 of the video processing pipeline 100 inputs the scene proxies that are output from the storage and distribution stage 108, and then renders images of the captured scene from the scene proxies, where these images have a fixed viewpoint that cannot be modified by an end user. The fixed viewpoint images of the captured scene are then output to the user viewing experience sub-stage 114 of the pipeline 100. The user viewing experience sub-stage 114 inputs the fixed viewpoint images of the captured scene from the rendering sub-stage 112, and then displays these images on a display device for viewing by a given end user. In situations where the generation stage 102 operates asynchronously from the end user presentation stage 110 (such as in the asynchronous single viewpoint video implementation that is described in more detail hereafter), the user viewing experience sub-stage 114 can provide the end user with the ability to interactively temporally navigate/control the single viewpoint video at will, and based on this temporal navigation/control the rendering sub-stage 112 will either temporally pause/stop, or rewind, or fast forward the single viewpoint video accordingly.

Referring again to FIG. 1, in the free viewpoint embodiment of the video generation technique described herein the rendering sub-stage 112 inputs the scene proxies that are output from the storage and distribution stage 108, and then renders images of the captured scene from the scene proxies, where these images have a synthetic viewpoint that can be modified by an end user. The synthetic viewpoint images of the captured scene are then output to the user viewing experience sub-stage 114. The user viewing experience sub-stage 114 inputs the synthetic viewpoint images of the captured scene from the rendering sub-stage 112, and then displays these images on a display device for viewing by a given end user. Generally speaking, the user viewing experience sub-stage 114 can provide the end user with the ability to spatio/temporally navigate/control the synthetic viewpoint images of the captured scene on-the-fly at will. In other words, the user viewing experience sub-stage 114 can provide the end user with the ability to continuously and interactively navigate/control their viewpoint of the images of the scene that are being displayed on the display device, and based on this viewpoint navigation the rendering sub-stage 112 will modify the images of the scene accordingly. In situations where the generation stage 102 operates asynchronously from the end user presentation stage 110 (such as in the asynchronous free viewpoint video implementation that is described in more detail hereafter), the user viewing experience sub-stage 114 can also provide the end user with the ability to interactively temporally navigate/control the free viewpoint video at will, and based on this temporal navigation/control the rendering sub-stage 112 will either temporally pause/stop, or rewind, or fast forward the free viewpoint video accordingly.

1.2 Video Generation

This section provides a more detailed description of the generation stage of the video processing pipeline. As described heretofore, the video generation technique embodiments described herein generally employ one or more sensors which can be configured in various arrangements to capture a scene. These one or more sensors generate one or more streams of sensor data each of which represents the scene from a different geometric perspective.

Figure 2:
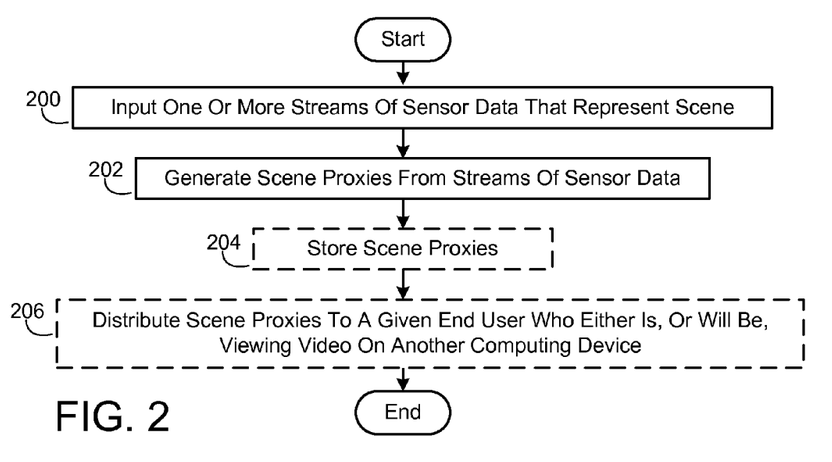
FIG. 2 is a flow diagram illustrating an exemplary embodiment, in simplified form, of a process for generating a video of a scene.

FIG. 2 illustrates an exemplary embodiment, in simplified form, of a process for generating a video of a scene. As exemplified in FIG. 2, the process starts in block 200 with inputting the one or more streams of sensor data that represent the scene. Scene proxies are then generated from these streams of sensor data (block 202), where the scene proxies geometrically describe the scene as a function of time. The scene proxies can then be stored (block 204). In a situation where a given end user either is, or will be, viewing the video on another computing device which is connected to a data communication network, the scene proxies can also be distributed to the end user (block 206).

Figure 3:
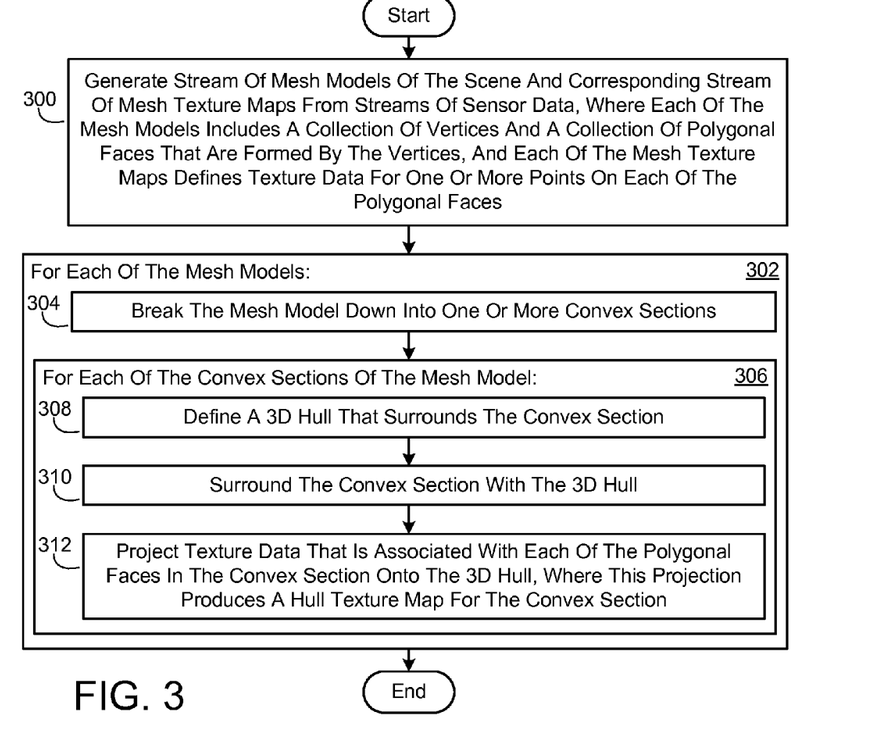
FIG. 3 is a flow diagram illustrating an exemplary embodiment, in simplified form, of a process for generating scene proxies that geometrically describe the scene as a function of time.

FIG. 3 illustrates an exemplary embodiment, in simplified form, of a process for generating the scene proxies from the one or more streams of sensor data that represent the scene. As exemplified in FIG. 3, the process starts in block 300 with generating a stream of mesh models of the scene and a corresponding stream of mesh texture maps from the streams of sensor data, where each of the mesh models includes a collection of vertices and a collection of polygonal faces that are formed by the vertices, and each of the mesh texture maps defines texture data for one or more points on each of the polygonal faces. Generally speaking and as is appreciated in the art of parametric texture mapping, the mesh texture maps can apply various textures to the polygonal faces in order to maximize the photo-realism of the objects that are represented by the mesh models. In other words, the texture data that is defined by the mesh texture maps can include one or more of color data, or specular highlight data, or transparency data, or reflection data, or shadowing data, among other things. Additionally, the mesh texture maps can define texture data for various points on each of the faces. By way of example but not limitation, texture data can be defined for just a single point (such as a centroid, among others) on a given face. Texture data can also be defined for each of the vertices of a given face. Texture data can also be defined for points along the edges of a given face between the vertices that form the edges, or in the interior of the face.

Referring again to FIG. 3, after the stream of mesh models and corresponding stream of mesh texture maps have been generated (block 300), the following actions then take place for each of the mesh models (block 302). The mesh model is broken down into one or more convex sections (block 304), and the following actions then take place for each of the convex sections of the mesh model (block 306). A 3D hull is defined that surrounds the convex section (block 308). The convex section is then surrounded with the 3D hull (block 310). The texture data that is associated with each of the polygonal faces in the convex section is then projected onto the 3D hull, where this projection produces a hull texture map for the convex section (block 312).

It will be appreciated that each of the mesh models can be broken down into one or more convex sections using various methods, one example of which will now be described in more detail.

Figure 4:
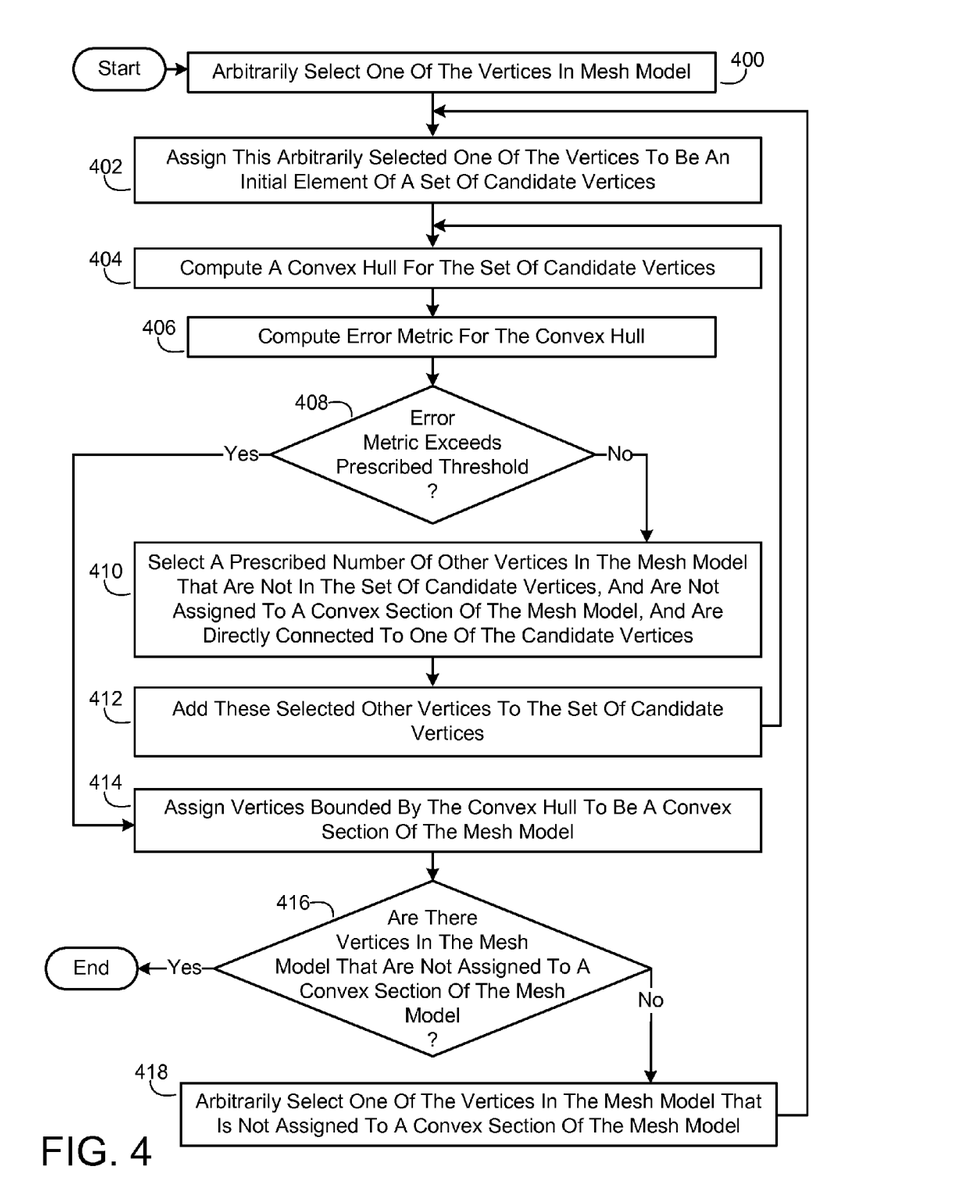
FIG. 4 is a flow diagram illustrating an exemplary embodiment, in simplified form, of a process for breaking down a given mesh model in the scene proxies into one or more convex sections.

FIG. 4 illustrates an exemplary embodiment, in simplified form, of a process for breaking down a given mesh model into one or more convex sections. As exemplified in FIG. 4, the process starts in block 400 with arbitrarily selecting one of the vertices in the mesh model. This arbitrarily selected one of the vertices is then assigned to be an initial element of a set of candidate vertices (block 402). A convex hull is then computed for the set of candidate vertices (block 404), where this computation can be performed using various conventional methods. An error metric for the convex hull is then computed (block 406). Then, whenever the error metric does not exceed a prescribed threshold (block 408, No), the following actions are performed. A prescribed number of other vertices in the mesh model that are not in the set of candidate vertices, and are not assigned to a convex section of the mesh model, and are directly connected (via an edge in the mesh model) to one of the candidate vertices, are selected (block 410). These selected other vertices are then added to the set of candidate vertices (block 412), and the actions of blocks 404-408 are repeated. In one embodiment of the video generation technique described herein the prescribed number is one. In another embodiment of the video generation technique the prescribed number is greater than one.

Referring again to FIG. 4, whenever the error metric exceeds the prescribed threshold (block 408, Yes), the following actions are performed. The vertices that are bounded by the convex hull are assigned to be a convex section of the mesh model (block 414). Whenever there are vertices in the mesh model that are not assigned to a convex section of the mesh model (block 416, No), one of the vertices in the mesh model that is not assigned to a convex section of the mesh model is then arbitrarily selected (block 418), and the actions of blocks 402-416 are repeated. Based on the process that is exemplified in FIG. 4, it will be appreciated that each of the convex sections of each of the mesh models will include a plurality of vertices.

Figure 5:
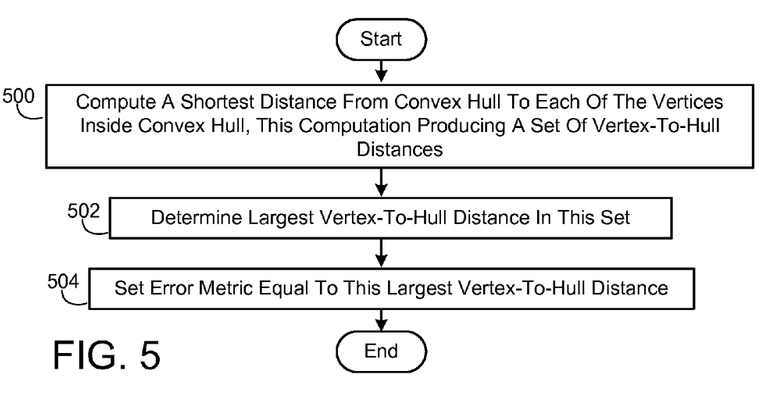
FIG. 5 is a flow diagram illustrating one embodiment, in simplified form, of a process for computing an error metric for a convex hull which is computed for a set of vertices in the mesh model.

FIG. 5 illustrates one embodiment, in simplified form, of a process for computing an error metric for the convex hull. As exemplified in FIG. 5, the process starts in block 500 with computing a shortest distance from the convex hull to each of the vertices that are inside the convex hull, where this computation produces a set of vertex-to-hull distances. The largest vertex-to-hull distance in this set is then determined (block 502). The error metric is then set equal to this largest vertex-to-hull distance (block 504).

Figure 6:
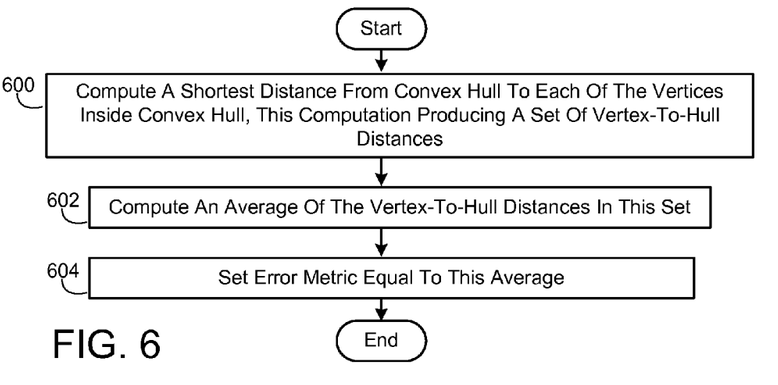
FIG. 6 is a flow diagram illustrating another embodiment, in simplified form, of a process for computing an error metric for a convex hull which is computed for a set of vertices in the mesh model.

FIG. 6 illustrates another embodiment, in simplified form, of a process for computing an error metric for the convex hull. As exemplified in FIG. 6, the process starts in block 600 with computing a shortest distance from the convex hull to each of the vertices that are inside the convex hull, where this computation produces a set of vertex-to-hull distances. An average of the vertex-to-hull distances in this set is then computed (block 602). The error metric is then set equal to this average (block 604).

It will be appreciated that various methods can be used to define a 3D hull that surrounds a given convex section of a given mesh model, one example of which will now be described in more detail.

Figure 7:
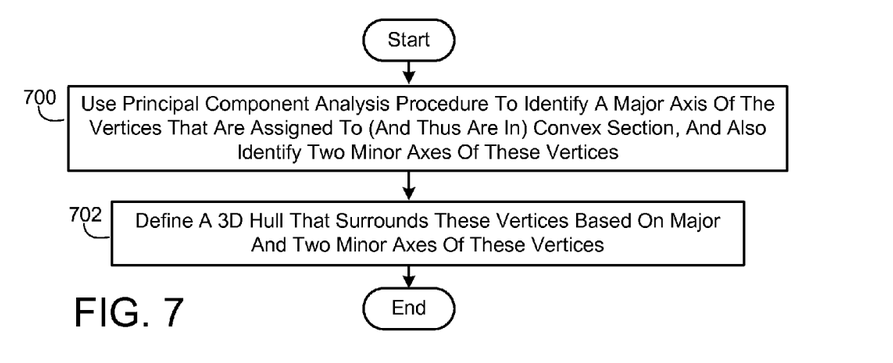
FIG. 7 is a flow diagram illustrating an exemplary embodiment, in simplified form, of a process for defining a 3D hull that surrounds a given convex section of a given mesh model.

FIG. 7 illustrates an exemplary embodiment, in simplified form, of a process for defining a 3D hull that surrounds a given convex section of a given mesh model. As exemplified in FIG. 7, the process starts in block 700 with using a conventional principal component analysis procedure to identify a major axis of the vertices that are assigned to (and thus are in) the convex section, and also identify two minor axes of these vertices. A 3D hull that surrounds these vertices is then defined based on the major and two minor axes of these vertices (block 702).

Figure 8:
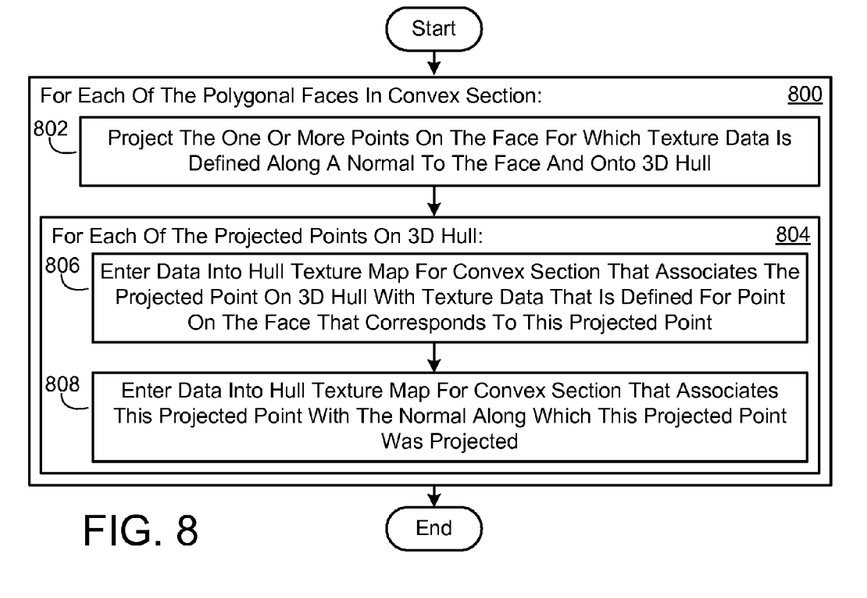
FIG. 8 is a flow diagram illustrating an exemplary embodiment, in simplified form, of a process for projecting texture data that is associated with polygonal faces in the given convex section onto the 3D hull that surrounds the given convex section.

FIG. 8 illustrates an exemplary embodiment, in simplified form, of a process for projecting the texture data that is associated with each of the polygonal faces in a given convex section onto the 3D hull that surrounds the convex section. As exemplified in FIG. 8, the following actions take place for each of the polygonal faces in the convex section (block 800). The one or more points on the face for which texture data is defined are projected along a normal to the face and onto the 3D hull (block 802). Then, for each of the projected points on the 3D hull (block 804), data is entered into the hull texture map for the convex section that associates the projected point on the 3D hull with the texture data that is defined for the point on the face that corresponds to this projected point (block 806), and data is entered into the hull texture map for the convex section that associates this projected point with the normal along which this projected point was projected (block 808). As is appreciated in the art of geometry, the normal to each of the faces in the convex section is known. As is also appreciated in the art of geometry, coordinates on the 3D hull uniquely identify the position of each projected point on the 3D hull. As such, each of the projected points on the 3D hull can be identified using its coordinates thereon.

Figure 9:
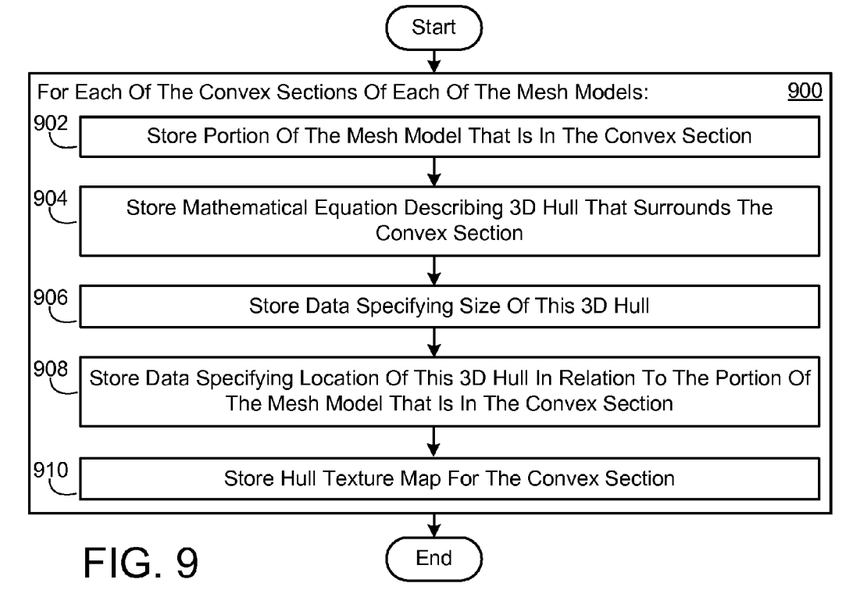
FIG. 9 is a flow diagram illustrating an exemplary embodiment, in simplified form, of a process for storing the scene proxies.

FIG. 9 illustrates an exemplary embodiment, in simplified form, of a process for storing the scene proxies. As exemplified in FIG. 9, the following actions take place for each of the convex sections of each of the mesh models (block 900). The portion of the mesh model that is in the convex section is stored (block 902). A mathematical equation describing the 3D hull that surrounds the convex section is also stored (block 904). Data specifying the size of this 3D hull is also stored (block 906). Data specifying the position of this 3D hull in relation to the portion of the mesh model that is in the convex section is also stored (block 908). The hull texture map for the convex section is also stored (block 910).

It will be appreciated that various types of data can be used to specify the position of the 3D hull in relation to the portion of the mesh model that is in the convex section which is surrounded by the 3D hull. By way of example but not limitation, the position of one or more geometric anchor points on the 3D hull can be specified in relation to one or more of the vertices in the mesh model. Whenever the 3D hull that surrounds a given convex section is either a sphere or an ellipsoid, the data specifying the size of the 3D hull can be the lengths of the axes thereof, among other things. Whenever the 3D hull that surrounds a given convex section is a cube, the data specifying the size of the 3D hull can be the length of an edge thereof. Whenever the 3D hull that surrounds a given convex section is a rectangular cuboid, the data specifying the size of the 3D hull can be the height, length and depth thereof.

Figure 10:
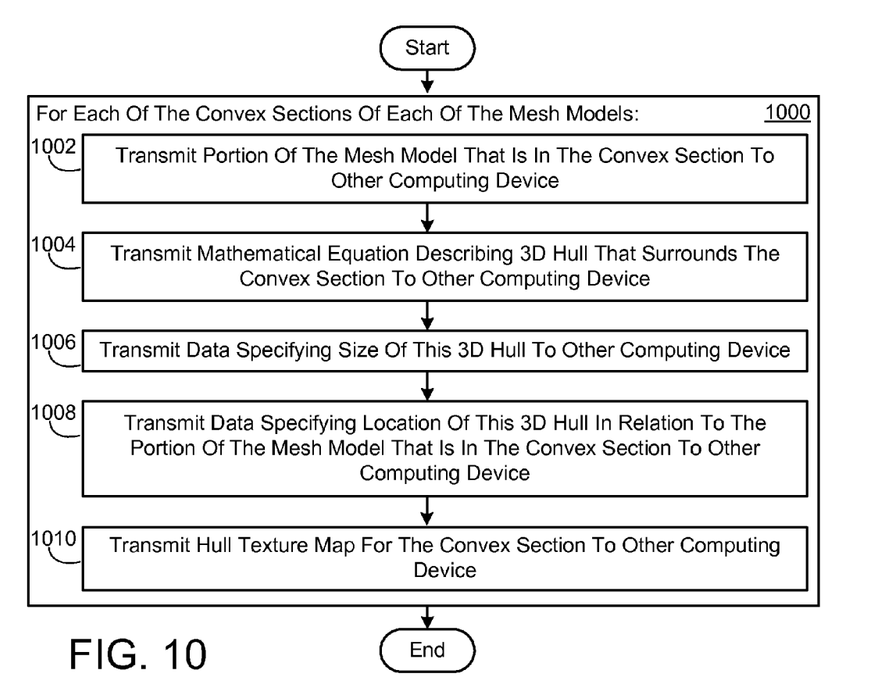
FIG. 10 is a flow diagram illustrating an exemplary embodiment, in simplified form, of a process for distributing the scene proxies to an end user who either is, or will be, viewing the video.

FIG. 10 illustrates an exemplary embodiment, in simplified form, of a process for distributing the scene proxies to an end user who either is, or will be, viewing the video on another computing device which is connected to a data communication network. As exemplified in FIG. 10, the following actions take place for each of the convex sections of each of the mesh models (block 1000). The portion of the mesh model that is in the convex section is transmitted over the network to the other computing device (block 1002). A mathematical equation describing the 3D hull that surrounds the convex section is also transmitted over the network to the other computing device (block 1004). Data specifying the size of this 3D hull is also transmitted over the network to the other computing device (block 1006). Data specifying the position of this 3D hull in relation to the portion of the mesh model that is in the convex section is also transmitted over the network to the other computing device (block 1008). The hull texture map for the convex section is also transmitted over the network to the other computing device (block 1010).

1.3 Video Presentation to End User

This section provides a more detailed description of the end user presentation stage of the video processing pipeline.

Figure 11:
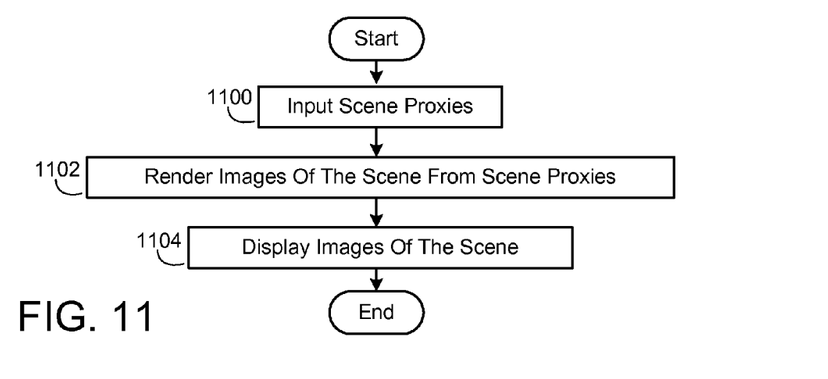
FIG. 11 is a flow diagram illustrating an exemplary embodiment, in simplified form, of a process for presenting the video of the scene to an end user.

FIG. 11 illustrates an exemplary embodiment, in simplified form, of a process for presenting a video of a scene to an end user. As exemplified in FIG. 11, the process starts in block 1100 with inputting scene proxies that geometrically describe the scene as a function of time. The scene proxies include a stream of mesh models of the scene, where each of the mesh models includes a collection of polygonal faces, and each of the mesh models is broken down into one or more convex sections. For each of the convex sections of each of the mesh models, the scene proxies also include a mathematical equation describing a 3D hull that surrounds the convex section, data specifying the size of this 3D hull, data specifying the position of this 3D hull in relation to the portion of the mesh model that is in the convex section, and a hull texture map for the convex section. This hull texture map includes data defining a plurality of points on the 3D hull that surrounds the convex section, and data for each of these points that associates the point with texture data and also associates the point with a normal along which the point was originally projected.

Referring again to FIG. 11, after the scene proxies have been input (block 1100), images of the scene are rendered from the scene proxies (block 1102). The images of the scene are then displayed on a display device (block 1104) so that they can be viewed and navigated by the end user. As described heretofore, the video that is being presented to the end user can be any type of video including, but not limited to, asynchronous single viewpoint video, or asynchronous free viewpoint video, or unidirectional live single viewpoint video, or unidirectional live free viewpoint video, or bidirectional live single viewpoint video, or bidirectional live free viewpoint video.

Figure 12:
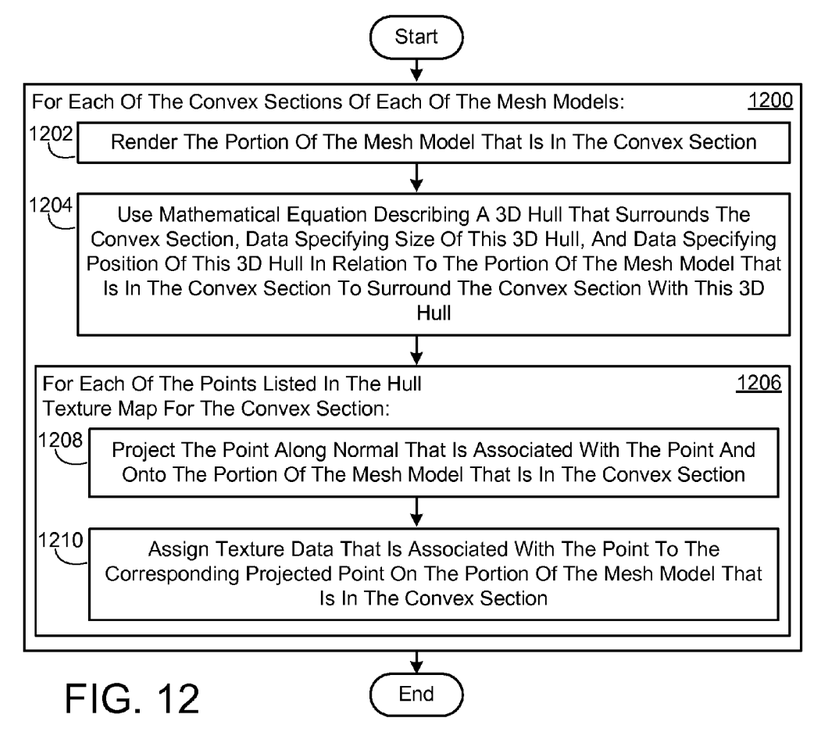
FIG. 12 is a flow diagram illustrating an exemplary embodiment, in simplified form, of a process for rendering images of the scene from the scene proxies.

FIG. 12 illustrates an exemplary embodiment, in simplified form, of a process for rendering images of the scene from the scene proxies. As exemplified in FIG. 12, the following actions take place for each of the convex sections of each of the mesh models (block 1200). The portion of the mesh model that is in the convex section is rendered (block 1202). The mathematical equation describing a 3D hull that surrounds the convex section, the data specifying the size of this 3D hull, and the data specifying the position of this 3D hull in relation to the portion of the mesh model that is in the convex section are then used to surround the convex section with this 3D hull (block 1204). Then, for each of the points that is listed in the hull texture map for the convex section (block 1206), the point is projected along the normal that is associated with the point and onto the portion of the mesh model that is in the convex section (block 1208), and the texture data that is associated with the point is assigned to the corresponding projected point on the portion of the mesh model that is in the convex section (block 1210).

1.4 Supported Video Types

This section provides a more detailed description of exemplary types of single viewpoint video and exemplary types of free viewpoint video that are supported by the video generation technique embodiments described herein.

Referring again to FIG. 1, one implementation of the single viewpoint embodiment of the video generation technique described heretofore supports asynchronous (i.e., non-live) single viewpoint video, and a similar implementation of the free viewpoint embodiment of the video generation technique described heretofore supports asynchronous free viewpoint video. Both of these implementations correspond to a situation where the streams of sensor data that are generated by the sensors are pre-captured 104, then post-processed 106, and the resulting scene proxies are then stored and can be transmitted in a one-to-many manner (i.e., broadcast) to one or more end users 108. As such, there is effectively an unlimited amount of time available for the processing sub-stage 106. This allows a video producer to optionally manually "touch-up" the streams of sensor data that are input during the capture sub-stage 104, and also optionally manually remove any 3D reconstruction artifacts that are introduced in the processing sub-stage 106. These particular implementations are referred to hereafter as the asynchronous single viewpoint video implementation and the asynchronous free viewpoint video implementation respectively. Exemplary types of video-based media that work well in the asynchronous single viewpoint video and asynchronous free viewpoint video implementations include movies, documentaries, sitcoms and other types of television shows, music videos, digital memories, and the like. Another exemplary type of video-based media that works well in the asynchronous single viewpoint video and asynchronous free viewpoint video implementations is the use of special effects technology where synthetic objects are realistically modeled, lit, shaded and added to a pre-captured scene.

Referring again to FIG. 1, another implementation of the single viewpoint embodiment of the video generation technique supports unidirectional (i.e., one-way) live single viewpoint video, and a similar implementation of the free viewpoint embodiment of the video generation technique supports unidirectional live free viewpoint video. Both of these implementations correspond to a situation where the streams of sensor data that are being generated by the sensors are concurrently captured 104 and processed 106, and the resulting scene proxies are stored and transmitted in a one-to-many manner on-the-fly (i.e., live) to one or more end users 108. As such, each end user can view 114 the scene live (i.e., each use can view the scene at substantially the same time it is being captured 104). These particular implementations are referred to hereafter as the unidirectional live single viewpoint video implementation and the unidirectional live free viewpoint video implementation respectively. Exemplary types of video-based media that work well in the unidirectional live single viewpoint video and unidirectional live free viewpoint video implementations include sporting events, news programs, live concerts, and the like.

Referring again to FIG. 1, yet another implementation of the single viewpoint embodiment of the video generation technique supports bidirectional (i.e., two-way) live single viewpoint video (such as that which is associated with various video-conferencing/telepresence applications), and a similar implementation of the free viewpoint embodiment of the video generation technique supports bidirectional live free viewpoint video. These particular implementations are referred to hereafter as the bidirectional live single viewpoint video implementation and the bidirectional live free viewpoint video implementation respectively. The bidirectional live single/free viewpoint video implementation is generally the same as the unidirectional live single/free viewpoint video implementation with the following exception. In the bidirectional live single/free viewpoint video implementation a computing device at each physical location that is participating in a given video-conferencing/telepresence session is able to concurrently capture 104 streams of sensor data that are being generated by sensors which are capturing a local scene and process 106 these locally captured streams of sensor data, store and transmit the resulting local scene proxies in a one-to-many manner on the fly to the other physical locations that are participating in the session 108, receive remote scene proxies from each of the remote physical locations that are participating in the session 108, and render 112 each of the received proxies.

Referring again to FIG. 1, it will be appreciated that in the unidirectional and bidirectional live single and free viewpoint video implementations in order for an end user to be able to view the scene live, the generation, storage and distribution, and end user presentation stages 102/108/110 have to be completed within a very short period of time. The video generation technique embodiments described herein make this possible based on the aforementioned video size/data minimization that is achieved by the video generation technique embodiments.

2.0 Additional Embodiments

While the video generation technique has been described by specific reference to embodiments thereof, it is understood that variations and modifications thereof can be made without departing from the true spirit and scope of the video generation technique. By way of example but not limitation, rather than supporting the generation, storage, distribution, and end user presentation of video, alternate embodiments of the video generation technique described herein are possible which support any other digital image application where a scene is represented by a mesh model and a corresponding mesh texture map which defines texture data for the mesh model.

It is also noted that any or all of the aforementioned embodiments can be used in any combination desired to form additional hybrid embodiments. Although the video generation technique embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

3.0 Computing Environment

Figure 13:
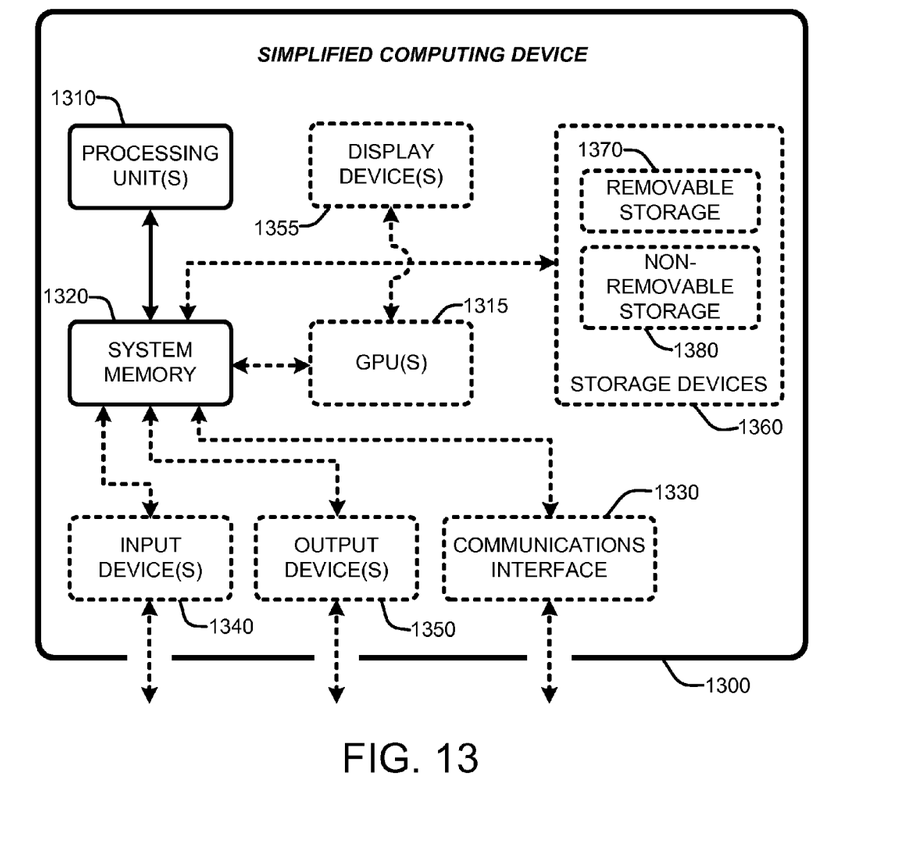
FIG. 13 is a diagram illustrating a simplified example of a general-purpose computer system on which various embodiments and elements of the video generation technique, as described herein, may be implemented.

The video generation technique embodiments described herein are operational within numerous types of general purpose or special purpose computing system environments or configurations. FIG. 13 illustrates a simplified example of a general-purpose computer system on which various embodiments and elements of the video generation technique, as described herein, may be implemented. It is noted that any boxes that are represented by broken or dashed lines in FIG. 13 represent alternate embodiments of the simplified computing device, and that any or all of these alternate embodiments, as described below, may be used in combination with other alternate embodiments that are described throughout this document.

For example, FIG. 13 shows a general system diagram showing a simplified computing device 1300. Such computing devices can be typically be found in devices having at least some minimum computational capability, including, but not limited to, personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to implement the video generation technique embodiments described herein, the device should have a sufficient computational capability and system memory to enable basic computational operations. In particular, as illustrated by FIG. 13, the computational capability is generally illustrated by one or more processing unit(s) 1310, and may also include one or more graphics processing units (GPUs) 1315, either or both in communication with system memory 1320. Note that that the processing unit(s) 1310 may be specialized microprocessors (such as a digital signal processor (DSP), a very long instruction word (VLIW) processor, a field-programmable gate array (FPGA), or other micro-controller) or can be conventional central processing units (CPUs) having one or more processing cores including, but not limited to, specialized GPU-based cores in a multi-core CPU.

In addition, the simplified computing device 1300 of FIG. 13 may also include other components, such as, for example, a communications interface 1330. The simplified computing device 1300 of FIG. 13 may also include one or more conventional computer input devices 1340 (e.g., pointing devices, keyboards, audio (e.g., voice) input/capture devices, video input/capture devices, haptic input devices, devices for receiving wired or wireless data transmissions, and the like). The simplified computing device 1300 of FIG. 13 may also include other optional components, such as, for example, one or more conventional computer output devices 1350 (e.g., display device(s) 1355, audio output devices, video output devices, devices for transmitting wired or wireless data transmissions, and the like). Exemplary types of input devices (herein also referred to as user interface modalities) and display devices that are operable with the video generation technique embodiments described herein have been described heretofore. Note that typical communications interfaces 1330, additional types of input and output devices 1340 and 1350, and storage devices 1360 for general-purpose computers are well known to those skilled in the art, and will not be described in detail herein.

The simplified computing device 1300 of FIG. 13 may also include a variety of computer readable media. Computer readable media can be any available media that can be accessed by the computer 1300 via storage devices 1360, and includes both volatile and nonvolatile media that is either removable 1370 and/or non-removable 1380, for storage of information such as computer-readable or computer-executable instructions, data structures, program modules, or other data. By way of example but not limitation, computer readable media may include computer storage media and communication media. Computer storage media includes, but is not limited to, computer or machine readable media or storage devices such as digital versatile disks (DVDs), compact discs (CDs), floppy disks, tape drives, hard drives, optical drives, solid state memory devices, random access memory (RAM), read-only memory (ROM), electrically erasable programmable read-only memory (EEPROM), flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, and the like, can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves. Combinations of the any of the above should also be included within the scope of communication media.

Furthermore, software, programs, and/or computer program products embodying the some or all of the various embodiments of the video generation technique described herein, or portions thereof, may be stored, received, transmitted, or read from any desired combination of computer or machine readable media or storage devices and communication media in the form of computer executable instructions or other data structures.

Finally, the video generation technique embodiments described herein may be further described in the general context of computer-executable instructions, such as program modules, being executed by a computing device. Generally, program modules include routines, programs, objects, components, data structures, and the like, that perform particular tasks or implement particular abstract data types. The video generation technique embodiments may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Wherefore, what is claimed is:

1. A computer-implemented process for generating a video of a scene, comprising:
   using a computing device to perform the following process actions:
   inputting one or more streams of sensor data that represent the scene; and
   generating scene proxies from said streams of sensor data, said generation comprising the actions of:
      generating a stream of mesh models of the scene and a corresponding stream of mesh texture maps from said streams of sensor data, each of the mesh models comprising a collection of vertices and a collection of polygonal faces that are formed by the vertices, each of the mesh texture maps defining texture data for one or more points on each of the polygonal faces, and for each of the mesh models, breaking down the mesh model into one or more convex sections, and for each of the convex sections of the mesh model, defining a three-dimensional (3D) hull that surrounds the convex section, surrounding the convex section with the 3D hull, and projecting the texture data that is associated with each of the polygonal faces in the convex section onto the 3D hull, said projection producing a hull texture map for the convex section.

2. The process of claim 1, wherein the process action of breaking down the mesh model into one or more convex sections comprises the actions of:
(a) arbitrarily selecting one of the vertices in the mesh model;
(b) assigning said arbitrarily selected one of the vertices to be an initial element of a set of candidate vertices;
(c) computing a convex hull for the set of candidate vertices;
(d) computing an error metric for the convex hull;
(e) whenever the error metric does not exceed a prescribed threshold,
selecting a prescribed number of other vertices in the mesh model that are not in the set of candidate vertices, and are not assigned to a convex section of the mesh model, and are directly connected to one of the candidate vertices,
adding said selected other vertices to the set of candidate vertices, and
repeating actions (c)-(e);
(f) whenever the error metric exceeds the prescribed threshold, assigning the vertices that are bounded by the convex hull to be a convex section of the mesh model; and
(g) whenever there are vertices in the mesh model that are not assigned to a convex section of the mesh model,
arbitrarily selecting one of the vertices in the mesh model that is not assigned to a convex section of the mesh model, and
repeating actions (b)-(g).

3. The process of claim 2, wherein the process action of computing an error metric for the convex hull comprises the actions of:
computing a shortest distance from the convex hull to each of the vertices that are inside the convex hull, said computation producing a set of vertex-to-hull distances;
determining the largest vertex-to-hull distance in said set; and
setting the error metric equal to said largest vertex-to-hull distance.

4. The process of claim 2, wherein the process action of computing an error metric for the convex hull comprises the actions of:
computing a shortest distance from the convex hull to each of the vertices that are inside the convex hull, said computation producing a set of vertex-to-hull distances;
computing an average of the vertex-to-hull distances in said set; and
setting the error metric equal to said average.

5. The process of claim 2, wherein the prescribed number is one.

6. The process of claim 2, wherein the prescribed number is greater than one.

7. The process of claim 1, wherein each of the convex sections of each of the mesh models comprises a plurality of vertices, and the process action of defining a 3D hull that surrounds the convex section comprises the actions of:

using a principal component analysis procedure to identify a major axis of the vertices that are in the convex section, and also identify two minor axes of said vertices; and
defining a 3D hull that surrounds said vertices based on the major and two minor axes of said vertices.

8. The process of claim 1, wherein the 3D hull comprises a sphere.

9. The process of claim 1, wherein the 3D hull comprises an ellipsoid.

10. The process of claim 1, wherein the 3D hull comprises a cube.

11. The process of claim 1, wherein the 3D hull comprises a rectangular cuboid.

12. The process of claim 1, wherein the texture data comprises one or more of: color data, or specular highlight data, or transparency data, or reflection data, or shadowing data.

13. The process of claim 1, wherein the one or more streams of sensor data comprise a single stream of sensor data which represents the scene from a single geometric perspective, and the video being generated is a single viewpoint video.

14. The process of claim 1, wherein the one or more streams of sensor data comprise a plurality of streams of sensor data each of which represents the scene from a different geometric perspective, and the video being generated is a free viewpoint video.

15. The process of claim 1, wherein the process action of projecting the texture data that is associated with each of the polygonal faces in the convex section onto the 3D hull comprises the actions of:
for each of the faces in the convex section,
projecting the one or more points on the face for which texture data is defined along a normal to the face and onto the 3D hull, and
for each of the projected points on the 3D hull,
entering data into the hull texture map for the convex section that associates the projected point on the 3D hull with the texture data that is defined for the point on the face that corresponds to said projected point, and
entering data into said hull texture map that associates said projected point with the normal along which said projected point was projected.

16. The process of claim 1, further comprising an action of storing the scene proxies, said storing comprising the actions of:
for each of the convex sections of each of the mesh models,
storing the portion of the mesh model that is in the convex section,
storing a mathematical equation describing the 3D hull that surrounds the convex section,
storing data specifying the size of said 3D hull,
storing data specifying the position of said 3D hull in relation to said portion of the mesh model, and
storing the hull texture map for the convex section.

17. The process of claim 1, further comprising an action of distributing the scene proxies to an end user who either is, or will be, viewing the video on another computing device which is connected to a data communication network, said distribution comprising the actions of:
for each of the convex sections of each of the mesh models,
transmitting the portion of the mesh model that is in the convex section over the network to said other computing device,
transmitting a mathematical equation describing the 3D hull that surrounds the convex section over the network to said other computing device, transmitting data specifying the size of said 3D hull over the network to said other computing device, transmitting data specifying the position of said 3D hull in relation to said portion of the mesh model over the network to said other computing device, and transmitting the hull texture map for the convex section over the network to said other computing device.

18. A computer-implemented process for presenting a video of a scene to a user, comprising:

using a computing device to perform the following process actions:

inputting scene proxies, said scene proxies comprising:

a stream of mesh models of the scene, each of the mesh models comprising a collection of polygonal faces, each of the mesh models being broken down into one or more convex sections, and for each of the convex sections of each of the mesh models, a mathematical equation describing a three-dimensional (3D) hull that surrounds the convex section, data specifying the size of said 3D hull, data specifying the position of said 3D hull in relation to the portion of the mesh model that is in the convex section, and a hull texture map for the convex section, said map comprising data defining a plurality of points on said 3D hull, and data for each of said points that associates the point with texture data and also associates the point with a normal which defines a direction from one of said faces to said 3D hull;

rendering images of the scene from the scene proxies, said rendering comprising the actions of:

for each of the convex sections of each of the mesh models, rendering the portion of the mesh model that is in the convex section, using the mathematical equation describing a 3D hull that surrounds the convex section, the data specifying the size of said 3D hull, and the data specifying the position of said 3D hull in relation to said portion of the mesh model to surround the convex section with said 3D hull, and for each of the points that is listed in the hull texture map for the convex section, projecting the point along the normal that is associated with the point and onto the portion of the mesh model that is in the convex section, and assigning the texture data that is associated with the point to the corresponding projected point on said portion of the mesh model; and displaying the images of the scene.

19. The process of claim 18, wherein the video being presented comprises one of:

asynchronous single viewpoint video; or asynchronous free viewpoint video; or unidirectional live single viewpoint video; or unidirectional live free viewpoint video; or bidirectional live single viewpoint video; or bidirectional live free viewpoint video.

20. A system for generating a video of a scene, comprising:

a computing device; and a computer program having program modules executable by the computing device, the computing device being directed by the program modules of the computer program to, input one or more streams of sensor data that represent the scene, and generate scene proxies from said streams of sensor data, said generation comprising, generating a stream of mesh models of the scene and a corresponding stream of mesh texture maps from said streams of sensor data, and for each of the mesh models, breaking down the mesh model into one or more convex sections, and for each of the convex sections of the mesh model, defining a three-dimensional (3D) hull that surrounds the convex section, and projecting the texture data that is associated with each of the polygonal faces in the convex section onto the 3D hull, said projection producing a hull texture map for the convex section.

* * * * *